United States Patent [19]
Plichta et al.

[11] Patent Number: 5,312,623
[45] Date of Patent: May 17, 1994

[54] HIGH TEMPERATURE, RECHARGEABLE, SOLID ELECTROLYTE ELECTROCHEMICAL CELL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 80,150

[22] Filed: Jun. 18, 1993

[51] Int. Cl.$^5$ .............................................. H01M 4/48
[52] U.S. Cl. ..................................... 429/193; 429/218
[58] Field of Search ................................... 429/193, 218

[56] References Cited

U.S. PATENT DOCUMENTS 4,172,882  10/1979  Hong ................................... 423/331

FOREIGN PATENT DOCUMENTS 0160570  8/1985  Japan.
0165061  8/1985  Japan.

Primary Examiner—Prince Willis, Jr.
Assistant Examiner—M. Nuzzolillo
Attorney, Agent, or Firm—Michael Zelenka; Roy E. Gordon

[57] ABSTRACT

A high temperature rechargeable solid electrolyte electro-chemical cell is provided including an alloy of lithium as the anode, a compound selected from the group consisting of $MnO_2$, $FeS_2$, $CoS_2$, $MoS_2$, $MoS_3$, $NiS_2$, $LiCoO_2$, $LiNiO_2$, $V_6O_{13}$, $Cr_3O_8$, $V_2O_5$, $V_2S_5$, and other transition metal halides, chalcogenides, selenides, tellurides, and oxides as the cathode, and a solid solution of $Li_4GeO_4$ and $Li_3VO_4$ as the solid electrolyte.

4 Claims, 1 Drawing Sheet

HIGH TEMPERATURE, RECHARGEABLE, SOLID ELECTROLYTE ELECTROCHEMICAL CELL

GOVERNMENT INTEREST

The invention described herein may be manufactured, used, and licensed by or for the Government for governmental purposes without the payment to us of any royalties thereon.

FIELD OF INVENTION

This invention relates in general to a high temperature, rechargeable electrochemical cell and in particular to such a cell that includes a solid electrolyte.

BACKGROUND OF THE INVENTION

High temperature rechargeable molten salt cells are required for electric propulsion, load leveling and pulse power applications.

Heretofore, these batteries were being developed using highly conducting molten salt electrolytes. However, the use of molten electrolyte introduces problems of sealing the cells as well as corrosion of cell components at operating temperatures of about 300° to 500° C.

SUMMARY OF THE INVENTION

The general object of this invention is to provide a lithium rechargeable electrochemical cell or system that can be operated at high temperatures of about 300° to 500° C. A more particular object of the invention is to provide such a system as a safe rechargeable high energy density power source having excellent cycle life, component stability and low cost. Another object of the invention is to provide such a system that can be used in a bipolar battery configuration as a low volume power source for electronic equipment, electric vehicle propulsion, and robotics as well as general portable devices requiring a high power density battery.

It has now been found that the aforementioned objects can be attained by providing a rechargeable lithium solid state electrochemical system including a manganese dioxide cathode, a lithium-aluminum alloy anode, and a lithium ionically conductive solid electrolyte operated at elevated temperatures.

The lithium ion conducting solid electrolyte can conveniently be a solid solution of lithium germanium oxide ($Li_4GeO_4$) and lithium vanadium oxide ($Li_3VO_4$) and can be represented by the general formula $Li_{3+x}Ge_xV_{1-x}O_4$ where x has a value between 0.2 and 0.8. These solid solutions have high lithium ion conductivity at high temperature and when x=0.6, the solid solution with the composition $Li_{3.6}Ge_{0.6}V_{0.4}O_4$ has the highest conductivity of about 0.08 S/cm at 300° C. Thus, a cell can be made using this solid solution as the solid electrolyte and using lithium aluminum alloy as the anode and manganese dioxide as the cathode.

DESCRIPTION OF THE PREFERRED EMBODIMENT

The cell is made by pressing the manganese dioxide powder to 500 lbs in a 13 mm steel die and then pressing the powdered solid electrolyte ($Li_{3.6}Ge_{0.6}V_{0.4}O_4$) on top of the manganese dioxide to a pressure of 500 lbs. Finally, the lithium-aluminum alloy of 20 weight percent lithium anode powder is pressed on top of the solid electrolyte layer to a total pressure of 20,000 lbs. The assembled cell pellet is then placed between two molybdenum plates and held under pressure using a spring loaded jig.

Figure 1:
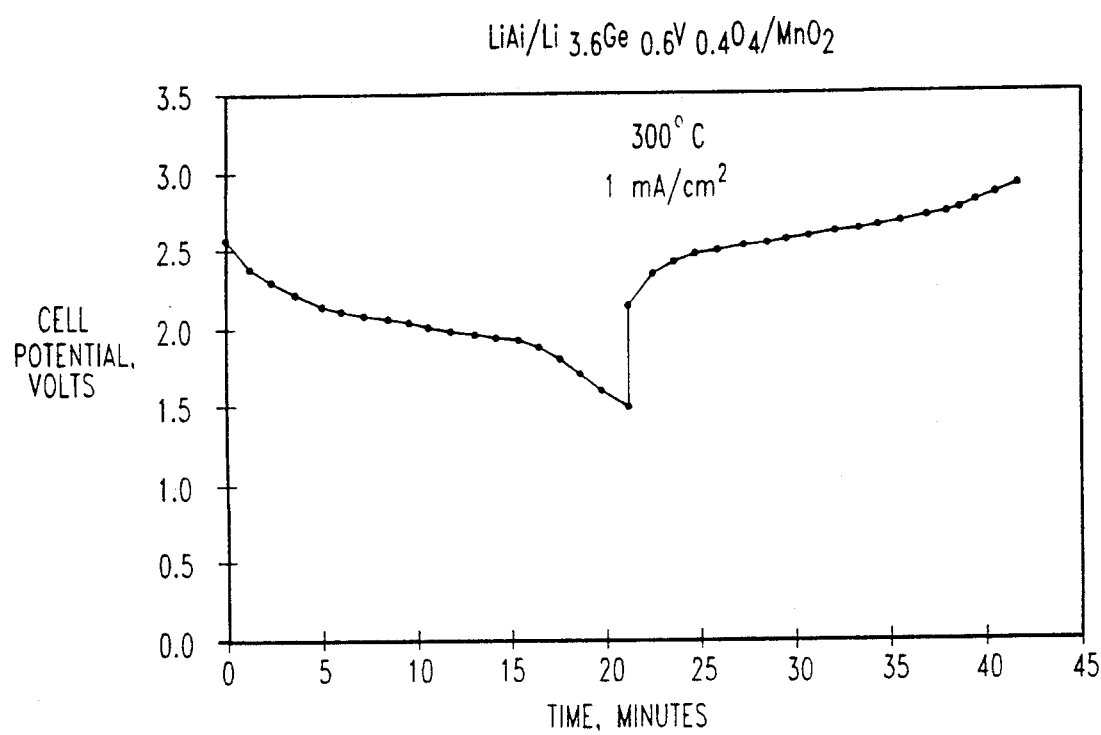
FIG. 1 shows the initial cycle of a cell $LiAl/Li_{3.6}Ge_{0.6}V_{0.4}O_4/MnO_2$ at 300° C. The discharge and charge current densities are 1 mA/cm$^2$. The potential limits are between 2.9 V and 1.5 V. The cell reaction on discharge may be represented as $LiAl + MnO_2 \rightleftarrows LiMnO_2 + Al$.

The cell reaction represented by the equation is reversed on charge. The cell exhibits an open circuit potential of about 2.6 V at 300° C. The theoretical energy density of the cell is estimated to be 577 WH/kg based on the cell reaction represented by the equation.

Other anode combinations that can supply a source of lithium ions for reaction with the $MnO_2$ can be used. These anode materials include LiSi, LiB, $LiTiS_2$, $LiVSe$, Li, $LiC_6$ and lithium intercalation compounds.

The cathode material may be $FeS_2$, $CoS_2$, $MoS_2$, $MoS_3$, $NiS_2$ $LiCoO_2$, $LiNiO_2$, $V_6O_{13}$, $Cr_3O_8$, $V_2O_5$, $V_2S_5$, and other transition metal halides, chalcogenides, selenides tellurides and oxides.

We wish it to be understood that we do not desire to be limited to the exact details of construction shown and described for obvious modifications will occur to a person skilled in the art.

What is claimed is:

1. A high temperature rechargeable solid electrolyte electrochemical cell including an alloy of lithium as the anode, a compound selected from the group consisting of $MnO_2$, $FeS_2$, $CoS_2$, $MoS_2$, $MoS_3$, $NiS_2$, $LiCoO_2$, $LiNiO_2$, $V_6O_{13}$, $Cr_3O_8$, $V_2O_5$, $V_2S_5$, and other transition metal halides, chalcogenides, selenides, tellurides and oxides as the cathode, and a solid solution of $Li_4GeO_4$ and $Li_3VO_4$ as the solid electrolyte.

2. A high temperature rechargeable solid electrolyte electrochemical cell according to claim 1 wherein the anode is selected from the group consisting of LiAl, LiSi, LiB, $LiC_6$, $LiTiS_2$, and $LiVSe_2$.

3. A high temperature rechargeable electrochemical cell according to claim 2, wherein the electrolyte is a solid solution of lithium germanium oxide and lithium vanadium oxide having the general formula $Li_{3+x}Ge_xV_{1-x}O_4$ where $0.2 < x < 0.8$.

4. A high temperature rechargeable electrochemical cell according to claim 2, wherein the anode is LiAl, the cathode is $MnO_2$, and the solid electrolyte is $Li_{3.6}Ge_{0.6}V_{0.4}O_4$.

* * * * *